Patented Nov. 7, 1933

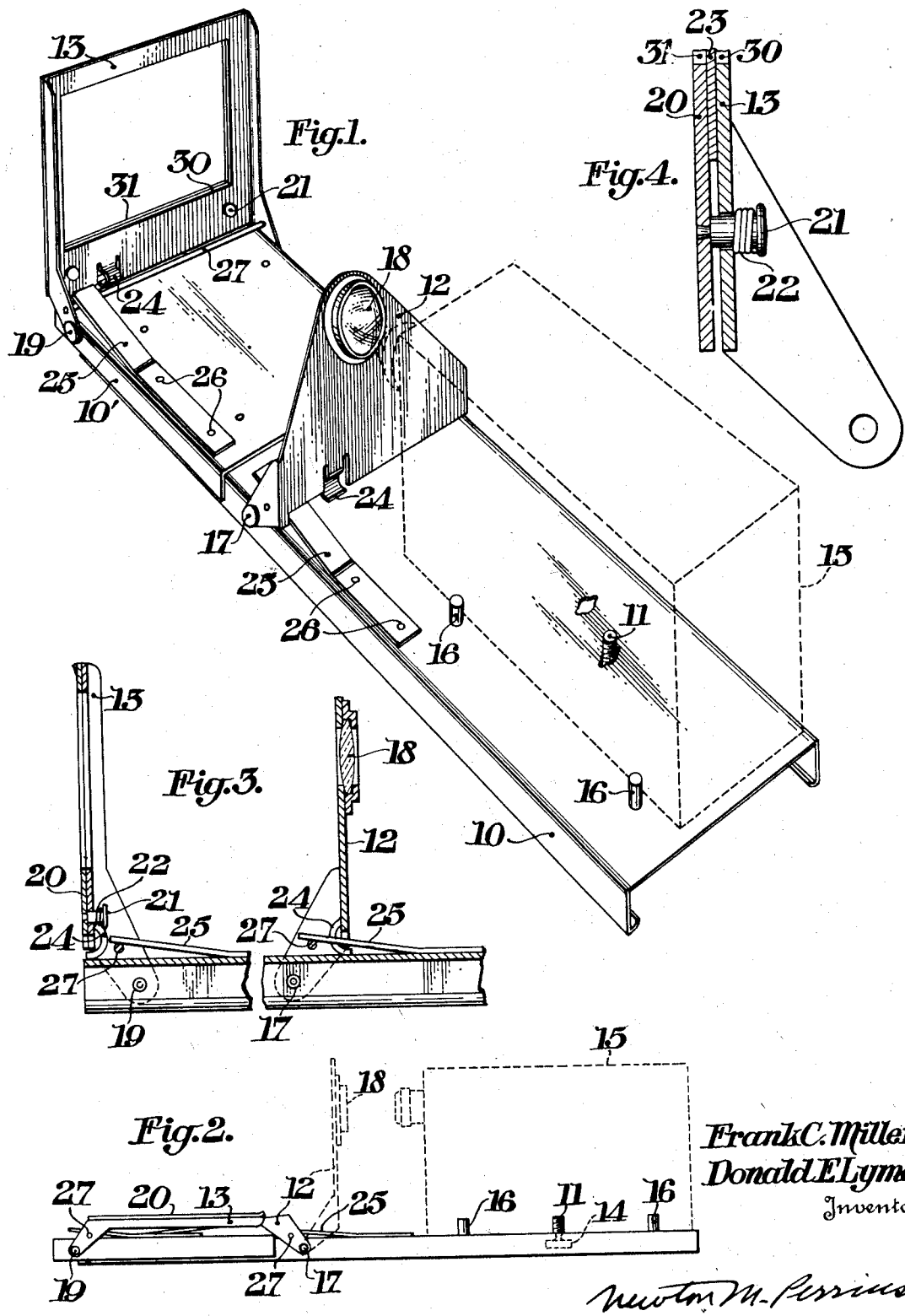

1,933,817

UNITED STATES PATENT OFFICE

1,933,817

DEVICE FOR PHOTOGRAPHING TITLES ON MOTION PICTURE FILM

Frank C. Miller and Donald F. Lyman, Rochester, N. Y., assignors to Eastman Kodak Company, Rochester, N. Y., a corporation of New York Application October 20, 1931. Serial No. 569,906

1 Claim. (Cl. 88—24)

Our invention relates to a photographic device for photographing titles on motion picture film although not limited to this use alone, and has for its general object the provision of a simple and effective device by means of which titles and other subjects may be photographed in an effective and convenient manner.

Another object is the provision of a device of the above character which is foldable in compact form when not in use, which preferably is made mainly of sheet metal, and which is particularly adapted for a certain well known motion picture camera.

The present invention relates to a portable device of a simple character whereby the titles may be photographed in their proper place upon the film between the view taking operation, whereby after development the views and the titles will appear in their proper place upon the film and can be suitably projected upon the screen. This method will greatly simplify the work required of the amateur.

Our invention will be readily understood from the following description when read in connection with the accompanying drawing in which like reference numerals designate like parts throughout.

In the drawing:

Figure 1 is a perspective view of a photographic device of our invention set up for use;

Figure 2 is a side elevation of the device in folded condition;

Figure 3 is a sectional view of certain details of the device; and,

Figure 4 is a sectional view of a portion of the card holder.

The apparatus comprises a flat frame 10 upon which are mounted in spaced relation a camera securing means 11 an auxiliary lens bracket 12 and a card or title holder 13. The frame 10 may be made of sheet metal and formed in one piece or it may have an auxiliary piece 10′ secured thereto for the purpose hereinafter to be described. The camera securing means mounted near one end of the frame 10 comprises a screw threaded member 11 which passes through the frame 10 and is provided at its underneath side with a knurled head 14 by which it may be turned. The threaded member 11 is adapted to enter the tripod socket of the camera and serve to secure the camera to the frame 10 in a definite position relative to the length of the frame. Studs 16 are also mounted at this end of the frame 10 and serve to definitely locate the camera 15 laterally on the frame 10. The bracket 12 is pivotally mounted at 17 to the frame 10 which permits the bracket 12 to be folded against the frame 10 as shown in Figure 2 or to be moved to perpendicular relation with respect to the frame 10 as shown in Figure 1 and indicated in Figure 2.

An auxiliary lens 18 suitably mounted in the bracket 12 is movable therewith and when in upright position is adapted to focus the camera on the card in the holder 13 now to be described.

The card holder 13 is hingedly mounted at 19 to the frame 10 and is adapted to assume a position perpendicular to the frame 10 as shown in Figures 1 and 3 or to be folded in overlying relation with the frame as shown in Figure 2. The easel or card holder 13 carries on one of its faces a sheet metal member 20 which is resiliently secured thereto by headed studs 21 provided with coiled springs 22 which permit a limited movement of the member 20 away from the easel 13 for the insertion of a card or sheet 23 bearing the title to be photographed. The compression of the springs 22 serves to hold the card 23 in any position and at the same time allows the operator to move the card in the easel to center the printed matter before the lens 18. It is therefore unnecessary for the title to be accurately centered on the card or paper.

The easel 13 as shown is provided with a cut out portion 30 which is of a size to equal the field of view of the camera and its outline may be used as an indicator for centering a card therein. We prefer to provide a similar cut out 31 in the member 20 so that the titles may be photographed by either reflected or transmitted light.

The bracket 12 and the holder 13 are each provided with an integrally formed stop 24 adapted to contact with the frame 10 to position them in perpendicular relation with the framed cam. In order to render stable both the folded and upright position of the bracket 12 and the easel 13 we have provided spring members 25 suitably secured to the frame 10 as by rivets 26 and each having one end free which rides on a part of the bracket 12 and the easel 13, respectively, which is movable therewith. Such part may comprise rods 27. Since this stabilizing is produced in the same way in both the easel 13 and the bracket 12 it will be here described only as applied to the bracket 12. The rod 27 is so mounted on the bracket 12 that it lies to one side of a line passing through the pivoting axis and perpendicular to the frame 10 when the bracket is folded or in upright position. As shown in Figure 3, force applied by the spring 25 to the rod 27 tends to rotate the bracket in a clockwise direction and since the stop 24 bearing against the frame 10 prevents any movement it is obvious that the bracket 12 is strongly biased in a stable upright position. When the bracket 12 is folded against the frame 10 as shown in Figure 2 the force applied by the spring 25 tends to hold it against the frame. The same arrangement is utilized to bias the easel 12 in each of its two positions and need not be described in detail.

For manufacturing purposes, we prefer to mount the easel 13 on an auxiliary part 10' of the frame 10 so that in assembling the device this part may be adjusted lengthwise of the frame until the easel lies in the conjugate focal plane of the camera as determined for the characteristics of the auxiliary lens 18. After such adjustment has been made the part 10' is permanently secured to the frame 10 in any suitable manner.

In order to use our device the camera 15 is mounted as indicated in Figures 1 and 2 by screwing the member 11 into the tripod socket of the camera which together with the studs 16 locates the camera in a predetermined position on the frame 10. The easel 13 and the bracket 12 are then moved to upright position and held in such position by the springs 25 as above described. The operator then inserts the card or sheet of paper 23, upon which has been inscribed the desired title, between the two portions of the easel and adjusts its position therein until it is centered in the cut out frame in the easel. The camera is then operated to expose the desired length of film.

The use of the auxiliary lens 18 serves as a focus modifying lens and shortens the focus of the camera objective sufficiently to limit the length of the device as well as permit the use of typewritten titles and still obtain letters of sufficient size to be readily legible and pleasing in appearance when projected.

While we have described and shown the preferred embodiments of our invention we do not wish to be limited to the precise details of construction as changes may readily be made without departing from the spirit of our invention, the scope of which is pointed out in the appended claim.

What we claim as new and desire to secure by Letters Patent of the United States is:

In an apparatus for photographing titles or the like the combination of a substantially flat frame having means for removably securing a camera thereon in a predetermined position, sheet-like members pivotedly mounted on the frame in predetermined spaced relation, whereby the sheet-like members are movable into and out of perpendicular relation with said frame and resilient means for yieldably holding said members in said perpendicular relation, one of said members comprising a card holder and the other of said members being provided with a lens for focusing the camera on the card holder member when both of said members are in perpendicular relation with said frame.

FRANK C. MILLER.
DONALD F. LYMAN.